(12) United States Patent
Whittle et al.

(10) Patent No.: US 11,504,813 B2
(45) Date of Patent: Nov. 22, 2022

(54) METHODS FOR HEALTH MONITORING OF CERAMIC MATRIX COMPOSITE COMPONENTS IN GAS TURBINE ENGINES

(71) Applicants: Rolls-Royce plc, London (GB); Rolls-Royce High Temperature Composites Inc., Cypress, CA (US)

(72) Inventors: Michael J. Whittle, London (GB); Stephen Harris, Cypress, CA (US); Keith Sadler, London (GB); Matthew D. Thomason, London (GB); Andrew Norton, London (GB); James Kell, London (GB)

(73) Assignees: Rolls-Royce plc; Rolls-Royce High Temperature Composites Inc., Cypress, CA (US)

( * ) Notice: Subject to any disclaimer, the term of this patent is extended or adjusted under 35 U.S.C. 154(b) by 243 days.

(21) Appl. No.: 16/876,834

(22) Filed: May 18, 2020

(65) Prior Publication Data
US 2021/0354253 A1    Nov. 18, 2021

(51) Int. Cl.
*B23P 6/00* (2006.01)
*F01D 5/00* (2006.01)
*F01D 5/28* (2006.01)
*G01M 15/14* (2006.01)

(52) U.S. Cl.
CPC ............ *B23P 6/002* (2013.01); *F01D 5/005* (2013.01); *F01D 5/284* (2013.01); *G01M 15/14* (2013.01); *F05D 2300/21* (2013.01); *Y10T 29/49318* (2015.01)

(58) Field of Classification Search
CPC .......................... B23P 6/002; Y10T 29/49318
See application file for complete search history.

(56) References Cited

U.S. PATENT DOCUMENTS

| | | | |
|---|---|---|---|
| 6,499,350 B1 | 12/2002 | Board et al. | |
| 6,820,334 B2 | 11/2004 | Kebbede et al. | |
| 6,892,127 B2 | 5/2005 | Wiseman | |
| 7,176,448 B2 | 2/2007 | Ogisu et al. | |
| 7,204,019 B2 * | 4/2007 | Ducotey, Jr. ............ | C23C 4/02 29/402.06 |
| 7,758,301 B2 | 7/2010 | Bilson et al. | |
| 7,780,400 B2 | 8/2010 | Bilson | |
| 7,782,221 B2 | 8/2010 | Arguello et al. | |

(Continued)

FOREIGN PATENT DOCUMENTS

| | | |
|---|---|---|
| DE | 19727296 | 1/1999 |
| DE | 102004036725 | 8/2005 |

(Continued)

OTHER PUBLICATIONS

Extended EP Search Report completed Jul. 30, 2021 and issued in connection with EP 21169055.7, 9 pages.

*Primary Examiner* — Sarang Afzali
(74) *Attorney, Agent, or Firm* — Barnes & Thornburg LLP

(57) ABSTRACT

A method comprises inspecting a ceramic matrix composite component assembled in a gas turbine engine to determine an extent of damage to the ceramic matrix composite component, determining a repair technique to repair the damage to the ceramic matrix composite component based on the extent of damage to the ceramic matrix composite component, and repairing the ceramic matrix composite component using the repair technique.

16 Claims, 8 Drawing Sheets

(56) References Cited

U.S. PATENT DOCUMENTS

| | | |
|---|---|---|
| 7,824,147 B2 | 11/2010 | Morris et al. |
| 8,576,392 B2 | 11/2013 | Johnston |
| 9,046,000 B2 | 6/2015 | Kominsky |
| 9,073,793 B2 | 7/2015 | Kirby et al. |
| 9,212,100 B2 | 12/2015 | Kirby et al. |
| 9,297,308 B2 | 3/2016 | Tsutsumi et al. |
| 9,670,793 B2 | 6/2017 | Zombo |
| 9,895,716 B2 * | 2/2018 | Roberts, III ............ B29C 73/02 |
| 10,024,187 B2 | 7/2018 | Soares et al. |
| 10,180,074 B2 | 1/2019 | Arik et al. |
| 2014/0241900 A1 | 8/2014 | Roberts, III et al. |
| 2016/0279744 A1 | 9/2016 | Harris |
| 2017/0184472 A1 | 6/2017 | Fechner et al. |
| 2017/0204737 A1 | 7/2017 | Varney et al. |
| 2018/0038813 A1 | 2/2018 | Shi |
| 2019/0249565 A1 | 8/2019 | Luck et al. |
| 2019/0375689 A1 * | 12/2019 | Saha .................. C04B 41/5096 |

FOREIGN PATENT DOCUMENTS

| | | |
|---|---|---|
| DE | 102005009531 | 1/2006 |
| DE | 102012221782 A1 | 5/2014 |
| EP | 1286020 A2 | 2/2003 |
| EP | 1455054 | 9/2004 |
| EP | 2236648 A1 | 10/2010 |
| EP | 2287135 | 2/2011 |
| EP | 3141631 | 3/2018 |
| GB | 2516080 | 1/2015 |
| JP | 2004028036 | 1/2004 |
| WO | 0135248 A2 | 5/2001 |
| WO | 2618128676 A1 | 7/2018 |

* cited by examiner

METHODS FOR HEALTH MONITORING OF CERAMIC MATRIX COMPOSITE COMPONENTS IN GAS TURBINE ENGINES

FIELD OF THE DISCLOSURE

The present disclosure relates generally to gas turbine engines and more specifically to ceramic matrix composite components for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine are conducted toward airfoils included in stationary vanes and rotating blades of the turbine. The airfoils, vanes, shrouds, and combustor components are often made from high-temperature resistant materials and/or are actively cooled by supplying relatively cool air to the vanes and blades due to the high temperatures of the combustion products. To this end, some airfoils for vanes and blades, shrouds, seals, and combustor components are incorporating composite materials adapted to withstand very high temperatures. However, ceramic matrix composite materials have a relatively low capability when subjected to impact from domestic or foreign object debris compared to components made from metallic materials.

SUMMARY

The present disclosure may comprise one or more of the following features and combinations thereof.

A method may include inspecting a ceramic matrix composite component assembled in a gas turbine engine to determine an extent of damage to the ceramic matrix composite component and determining if the extent of damage to the ceramic matrix composite component is above a predetermined threshold. The method may also include determining a repair technique to repair the damage to the ceramic matrix composite component based on the extent of damage to the ceramic matrix composite component and repairing the ceramic matrix composite component using the repair technique.

In some embodiments, the method may further include determining if the repaired damage to the ceramic matrix composite component is below a predetermined residual severity limit. If the repaired damage to the ceramic matrix composite component is below the predetermined residual severity limit, the method may further include clearing the gas turbine engine for flight.

In some embodiments, the method may further include receiving a signal to an engine health monitoring system included in the gas turbine engine. The signal may be indicative of a detection of impact damage to the ceramic matrix composite component in the gas turbine engine. If the extent of damage is below the predetermined threshold, the method may further include resetting the engine health monitoring system to detect the signal indicative of impact damage to the ceramic matrix composite component.

In some embodiments, the repair technique may include one of a direct repair and an in-direct repair of the ceramic matrix composite material of the ceramic matrix composite component. In some embodiments, the inspection step may include one of a visual inspection and a non-visual inspection of the extent of damage to the ceramic matrix composite component.

In some embodiments, the visual inspection may include at least comparing a shape of the ceramic matrix composite component to a datum shape, comparing a color of the ceramic matrix composite component to a datum color, and comparing a thermographic image of the ceramic matrix composite component to a datum thermographic image. The visual inspection may further include determining if the shape, color, and thermography of the ceramic matrix composite component is indicative of impact damage to the ceramic matrix composite component.

In some embodiments, the non-visual inspection may include comparing a stress level of the ceramic matrix composite component to a predetermined allowable stress threshold. The non-visual inspection may further include determining if the stress level is below the predetermined allowable stress threshold for the ceramic matrix composite component.

In some embodiments, the ceramic matrix composite component may include a protective coating. The protective coating may surround an outer surface of the ceramic matrix composite component.

In some embodiments, the protective coating may have a bond layer and an environmental barrier coating. The bond layer may contact the outer surface of the ceramic matrix composite component. The environmental barrier coating layer may surround the bond layer and may be exposed to hot gases flowing through a primary flow path of the gas turbine engine.

In some embodiments, the repair technique may include an in-direct repair of the ceramic matrix composite material of the ceramic matrix composite component. The repair technique may include the in-direct repair if the extent of damage to the ceramic matrix composite component includes cracking in the environmental barrier coating layer of the protective coating of the ceramic matrix composite component without spalling in the environmental barrier coating layer of the protective coating. The repair technique may include the in-direct repair if the extent of damage to the ceramic matrix composite component includes spalling in the environmental barrier coating layer of the protective coating without spalling in the bond layer of the protective coating.

In some embodiments, the in-direct repair may include reapplying a portion of the environmental barrier coating layer to a damaged area of the environmental barrier coating layer of the protective coating on the ceramic matrix composite component. The in-direct repair may include treating a surface of the damaged area of the environmental barrier coating layer and reapplying a portion of the environmental barrier coating layer of the protective coating on the ceramic matrix composite component that was treated.

In some embodiments, the repair technique may include an in-direct repair of the ceramic matrix composite material of the ceramic matrix composite component. The repair technique may include the in-direct repair if the extent of damage to the ceramic matrix composite component includes spalling in both the environmental barrier coating layer and the bond layer of the protective coating without recession of the ceramic matrix composite material of the ceramic matrix composite component.

In some embodiments, the in-direct repair may include reapplying a portion of the protective coating to a damaged area of the protective coating. The in-direct repair may include treating a surface of the damaged area of the protective coating on the ceramic matrix composite component and reapplying a portion of the protective coating on the ceramic matrix composite component that was treated.

In some embodiments, the repair technique may include a direct repair of the ceramic matrix composite material of the ceramic matrix composite component. The repair technique may include the direct repair if the extent of damage to the ceramic matrix composite component includes recession of the ceramic matrix composite material of the ceramic matrix composite component without spalling in the ceramic matrix composite material of the ceramic matrix composite component. The repair technique may include the direct repair if the extent of damage to the ceramic matrix composite component includes spalling in the ceramic matrix composite material of the ceramic matrix composite component without a hole extending through the ceramic matrix composite material into an interior cavity of the ceramic matrix composite component.

In some embodiments, the direct repair may include applying a ceramic matrix composite material patch to a damaged area in the ceramic matrix composite material of the ceramic matrix composite component. The direct repair may include machining a surface of the damaged area in the ceramic matrix composite material of the ceramic matrix composite component to smooth the surface of the ceramic matrix composite component.

In some embodiments, the repair technique may include one of a direct repair of the ceramic matrix composite material of the ceramic matrix composite component and an in-direct repair of the ceramic matrix composite material of the ceramic matrix composite component. The repair technique may include one of the direct repair and the in-direct repair if the extent of damage to the ceramic matrix composite component includes a hole that extends through the protective coating and ceramic matrix composite material of the ceramic matrix composite component and opens into an interior cavity formed in the ceramic matrix composite component.

In some embodiments, the in-direct repair may include sealing the hole in the ceramic matrix composite material of the ceramic matrix composite component to minimize ingress of hot gases into the interior cavity. The in-direct repair may include applying the protective coating to a surface of a metallic component located in the interior cavity of the ceramic matrix composite component.

In some embodiments, the method may further include receiving a signal to an engine health monitoring system included in the gas turbine engine. The signal may be indicative of a detection of impact damage to the ceramic matrix composite component in the gas turbine engine.

In some embodiments, the signal may be one of a temperature measurement and a pressure measurement within the gas turbine engine. The signal may be measured by a sensor included in the engine health monitoring system. In some embodiments, the ceramic matrix composite component is one of a vane component, a blade component, a shroud component, a seal component, and combustion liner component.

According to another aspect of the present disclosure, a gas turbine engine may include a turbine and an engine health monitoring system. The turbine may include a ceramic matrix composite component arranged to extend circumferentially at least partway about an axis and a metallic component arranged circumferentially around the ceramic matrix composite component. The engine health monitoring system may be configured to monitor damage to the ceramic matrix composite component in the gas turbine engine.

In some embodiments, the engine health monitoring system may be configured to inspect a ceramic matrix composite component assembled in a gas turbine engine to determine an extent of damage to the ceramic matrix composite component. In some embodiments, the engine health monitoring system may be configured to direct inspection of the ceramic matrix composite component assembled in a gas turbine engine to determine an extent of damage to the ceramic matrix composite component. The engine health monitoring system may determine if the extent of damage to the ceramic matrix composite component is above a predetermined threshold.

In some embodiments, the engine health monitoring system may be configured to determine a repair technique to repair the damage to the ceramic matrix composite component based on the extent of damage to the ceramic matrix composite component. The ceramic matrix composite component may be repaired using the repair technique determined by the engine health monitoring system.

In some embodiments, after the ceramic matrix composite material is repaired, the engine health monitoring system may be configured to determine if the repaired damage to the ceramic matrix composite component is below a predetermined residual severity limit. If the repaired damage to the ceramic matrix composite component is below the predetermined residual severity limit, the engine health monitoring system may clear the gas turbine engine for flight.

In some embodiments, the engine health monitoring system is configured to receive a signal. The signal may be indicative of a detection of impact damage to the ceramic matrix composite component in the gas turbine engine. If the extent of damage is below the predetermined threshold, the engine health monitoring system may reset to detect the signal indicative of impact damage to the ceramic matrix composite component.

In some embodiments, the signal may be one of a temperature measurement and a pressure measurement within the gas turbine engine. The signal may be measured by a sensor included in the engine health monitoring system. In some embodiments, the ceramic matrix composite component is one of a vane component, a blade component, a shroud component, a seal component, and combustion liner component.

In some embodiments, the inspection step may include one of a visual inspection and a non-visual inspection of the extent of damage to the ceramic matrix composite component. In some embodiments, the visual inspection may include at least comparing a shape of the ceramic matrix composite component to a datum shape, comparing a color of the ceramic matrix composite component to a datum color, and comparing a thermographic image of the ceramic matrix composite component to a datum thermographic image. The visual inspection may further include determining if the shape, color, and thermography of the ceramic matrix composite component is indicative of impact damage to the ceramic matrix composite component.

In some embodiments, the non-visual inspection may include comparing a stress level of the ceramic matrix composite component to a predetermined allowable stress threshold. The non-visual inspection may further include determining if the stress level is below the predetermined allowable stress threshold for the ceramic matrix composite component.

In some embodiments, the repair technique may include an in-direct repair of the ceramic matrix composite material of the ceramic matrix composite component. In some embodiments, the repair technique may include a direct repair of the ceramic matrix composite material of the ceramic matrix composite component.

These and other features of the present disclosure will become more apparent from the following description of the illustrative embodiments.

DETAILED DESCRIPTION OF THE DRAWINGS

Figure 1:
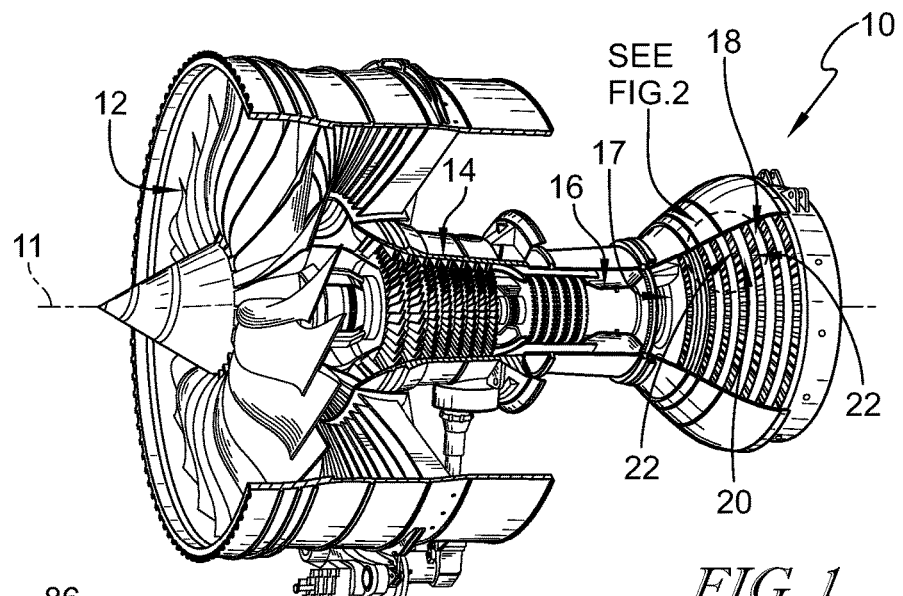
FIG. 1 is a cutaway view of a gas turbine engine that includes a fan, a compressor, a combustor, and a turbine, the turbine including rotating wheel assemblies configured to rotate about an axis of the engine and static turbine vane assemblies configured to direct air into downstream rotating wheel assemblies.

For the purposes of promoting an understanding of the principles of the disclosure, reference will now be made to a number of illustrative embodiments illustrated in the drawings and specific language will be used to describe the same.

Figure 3:
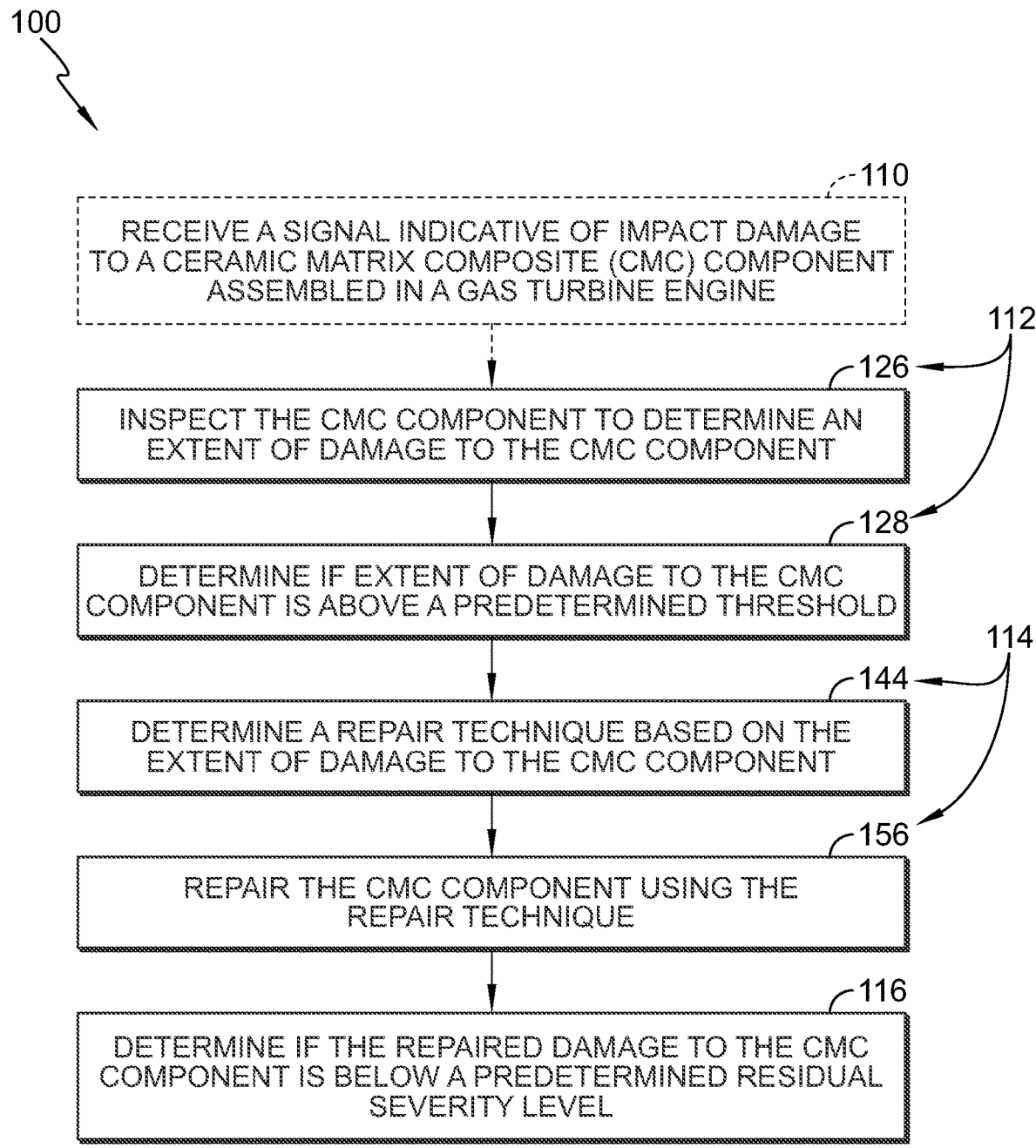
FIG. 3 is a diagrammatic view of a method of monitoring damage to a component made of ceramic matrix composite material included in one of the rotating wheel assemblies and the static turbine vane assembly of FIG. 2 showing the method includes (i) inspecting the ceramic matrix composite component to determine an extent of damage to the component, (ii) determining if the extent of damage to the ceramic matrix composite component is above a predetermined threshold, (iii) determining a repair technique to repair the damage to the ceramic matrix composite component based on the extent of damage to the component, and (iv) repairing the ceramic matrix composite component using the repair technique.

A method 100 for detecting, inspecting, and repairing impact damage to a ceramic matrix composite component 24, 26, 28 assembled in a gas turbine engine 10 is shown in FIG. 3. The gas turbine engine 10 includes a fan 12, a compressor 14, a combustor 16, and a turbine 18 as shown in FIG. 1. The fan 12 is driven by the turbine 18 and provides thrust for propelling an aircraft. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 of the gas turbine engine 10 and drive the compressor 14 and the fan 12.

Figure 2:
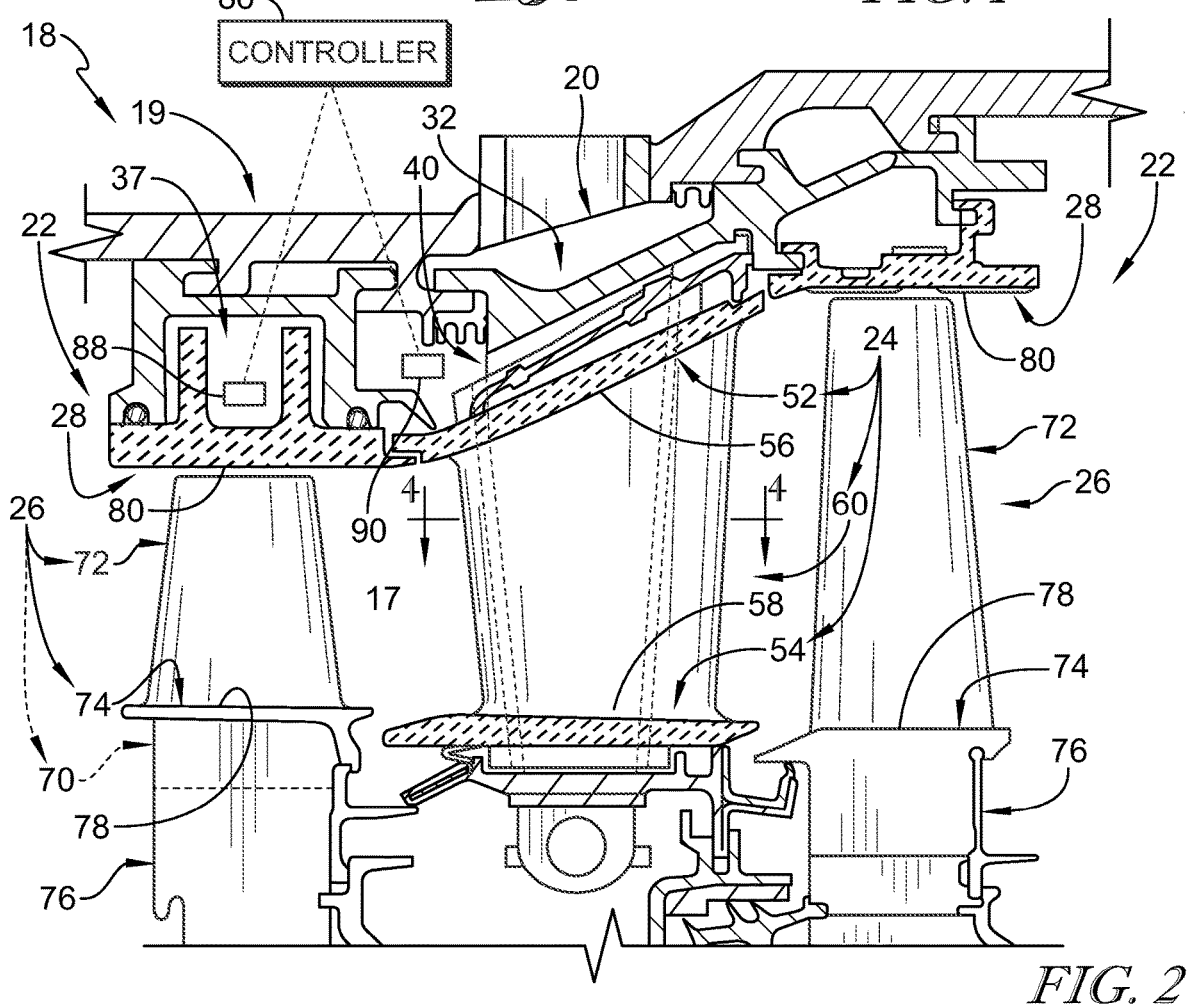
FIG. 2 is a section view of a portion of the turbine included in the gas turbine engine of FIG. 1 showing each static turbine vane assembly includes a ceramic matrix composite vane and a metallic vane support that couples the ceramic matrix composite vane to a turbine case.

The turbine 18 includes a turbine case 19, a plurality of static turbine vane assemblies 20 that are fixed relative to the axis 11, and a plurality of rotating bladed wheel assemblies 22 as suggested in FIGS. 1 and 2. The hot gases are conducted through the gas path 17 and interact with the bladed wheel assemblies 22 to cause the bladed wheel assemblies 22 to rotate about the axis 11. The turbine vane assembly 20 is arranged axially between the bladed wheel assemblies 22 and is positioned to direct the gases toward the downstream bladed wheel assembly 22 with a desired orientation.

Both the static turbine vane assembly 20 and the rotating bladed wheel assemblies 22 may include components 24, 26, 28 made from ceramic matrix composite materials, i.e. vanes 24, blades 26, and/or seal segments 28. The ceramic matrix composite materials of the components 24, 26, 28 are adapted to withstand high temperatures. However, ceramic matrix composite components 24, 26, 28 may have a relatively low capability when subjected to impact from domestic or foreign object debris.

Compared to components made from metallic materials, ceramic matrix composite components 24, 26, 28 are less tolerant to impact events. Therefore, it may be important to routinely inspect and repair the impact damage 30 to the ceramic matrix composite component 24, 26, 28 as suggested in FIG. 5. The method 100 includes several steps that enable continued operation in case of impact events without adversely affecting operational safety.

The method 100 includes an inspection step 112, a repair step 114, and an assessment step 116 as shown in FIGS. 3 and 6-9. The inspection step 112 includes inspecting the ceramic matrix composite component 24, 26, 28 to determine an extent of damage 30 to the ceramic matrix composite component 24, 26, 28 and determining if the extent of damage 30 to the ceramic matrix composite component 24, 26, 28 is above a predetermined threshold. The repair step 114 includes determining a repair technique to repair the damage to the ceramic matrix composite component 24, 26, 28 based on the extent of damage 30 to the ceramic matrix composite component 24, 26, 28 and repairing the ceramic matrix composite component 24, 26, 28 using the repair technique. The assessment step 116 includes determining the repaired damage is below a predetermined residual severity limit so that the engine 10 may be cleared or permitted for flight.

In the illustrative embodiment, the method 100 may further include a detection step 110 as suggested in FIG. 3. The detection step 110 includes detecting an impact event has occurred and inspection is suggested. Rather than routinely inspecting the ceramic matrix composite components 24, 26, 28 for damage 30 to the ceramic matrix composite material, the method 100 includes detecting damage to the component 24, 26, 28 using an engine health monitoring system, or EHM 86.

The impact damage 30 may be detected using the engine health monitoring system 86 in some embodiments, or may be detected during a routine checkup of the engine 10 in other embodiments. The detection step 110 may include receiving a signal to the engine health monitoring system 86 included in the gas turbine engine 10 as suggested by block 110 in FIG. 3. The signal is indicative of a detection of impact damage 30 to the ceramic matrix composite component 24, 26, 28 in the gas turbine engine 10.

In some embodiments, the signal is one of a temperature measurement and a pressure measurement within the gas turbine engine 10. The temperature and pressure may be measured by a sensor 88, 90 included in the engine health monitoring system 86.

In other embodiments, the signal measured by sensors 88, 90 may be other measurements in the engine e.g. shaft speeds, downstream temperatures, pipe pressure etc. that may subtly change as a result of the engine re-matching once the air system has been affected by the damage 30 to the component 24, 26, 28. In this way, the resolution of the engine health monitoring system algorithm may be improved. These other measurements may be used as calibration. In some embodiments, other engine performance parameters may be used to calibrate the health monitoring system 86. For example, this may be similar to how a Turbine Casing Cooling (TCC) control system functions and damage on the seal segment 26 would likely affect the TCC system.

Upon receipt of the signal, the engine health monitoring system 86 indicates the ceramic matrix composite component 24, 26, 28 may have impact damage 30 that could be inspected to determine the extent of damage 30 to the ceramic matrix composite component 24, 26, 28. After indication that the ceramic matrix composite component 24, 26, 28 may have impact damage 30, the method continues to the inspection step 112.

Figure 6:
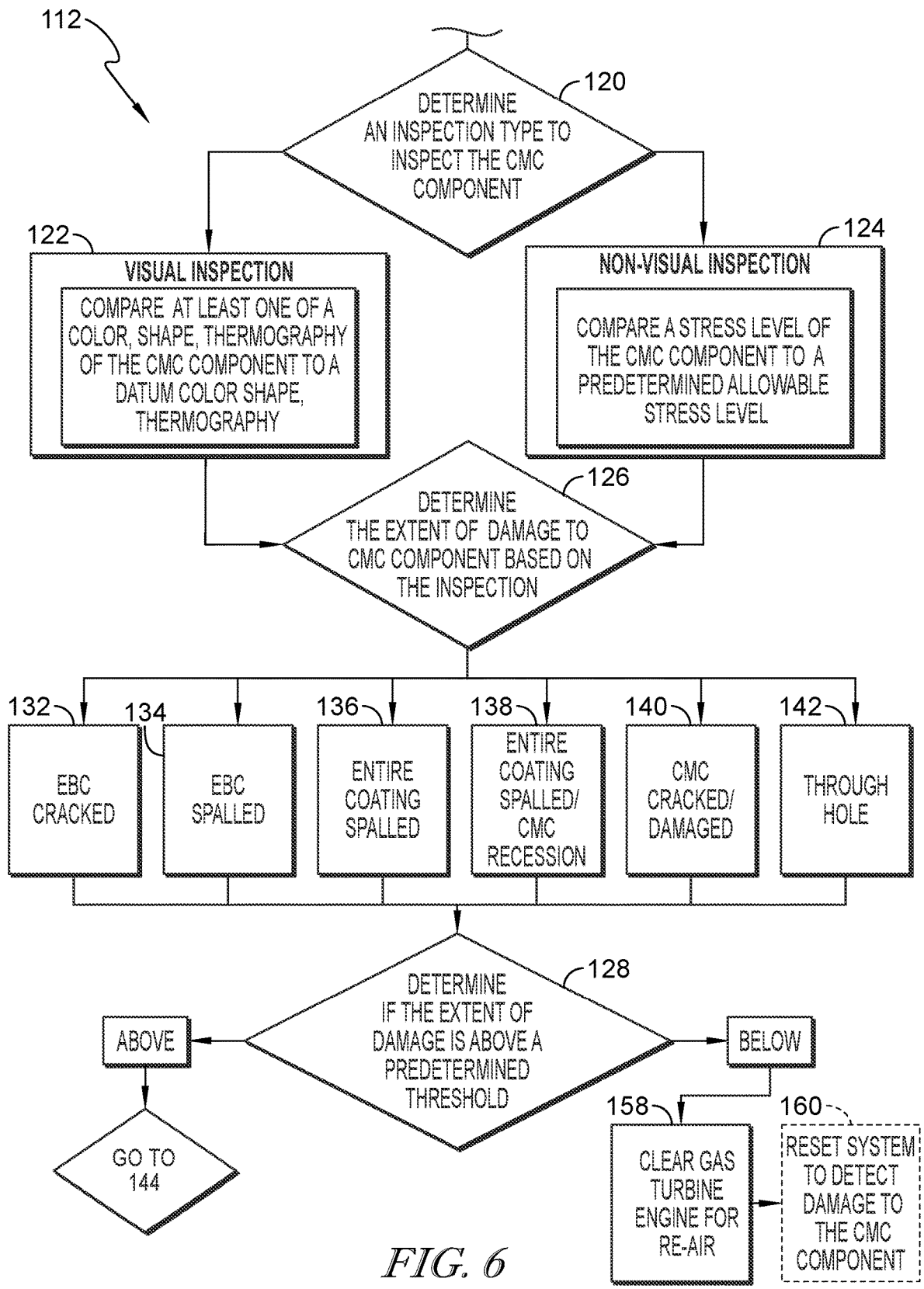
FIG. 6 is a diagrammatic view of the inspecting step of FIG. 3 showing the inspecting step includes one of a visual inspection and a non-visual inspection of the extent of damage to the ceramic matrix composite component.

Before the extent of damage 30 is inspected, the inspection step 112 begins by determining which type of inspection is to be used as indicated by block 120 as shown in FIG. 6. The extent of damage 30 is inspected by one of a visual inspection 122 and a non-visual inspection 124. The visual inspection 122 includes visibly observing a physical characteristic of the ceramic matrix composite component 24, 26, 28, such as color, shape, or thermography. The non-visual inspection 124 includes measuring other non-visual characteristics of the component 24, 26, 28, such as stress levels in the component 24, 26, 28.

Figure 4:
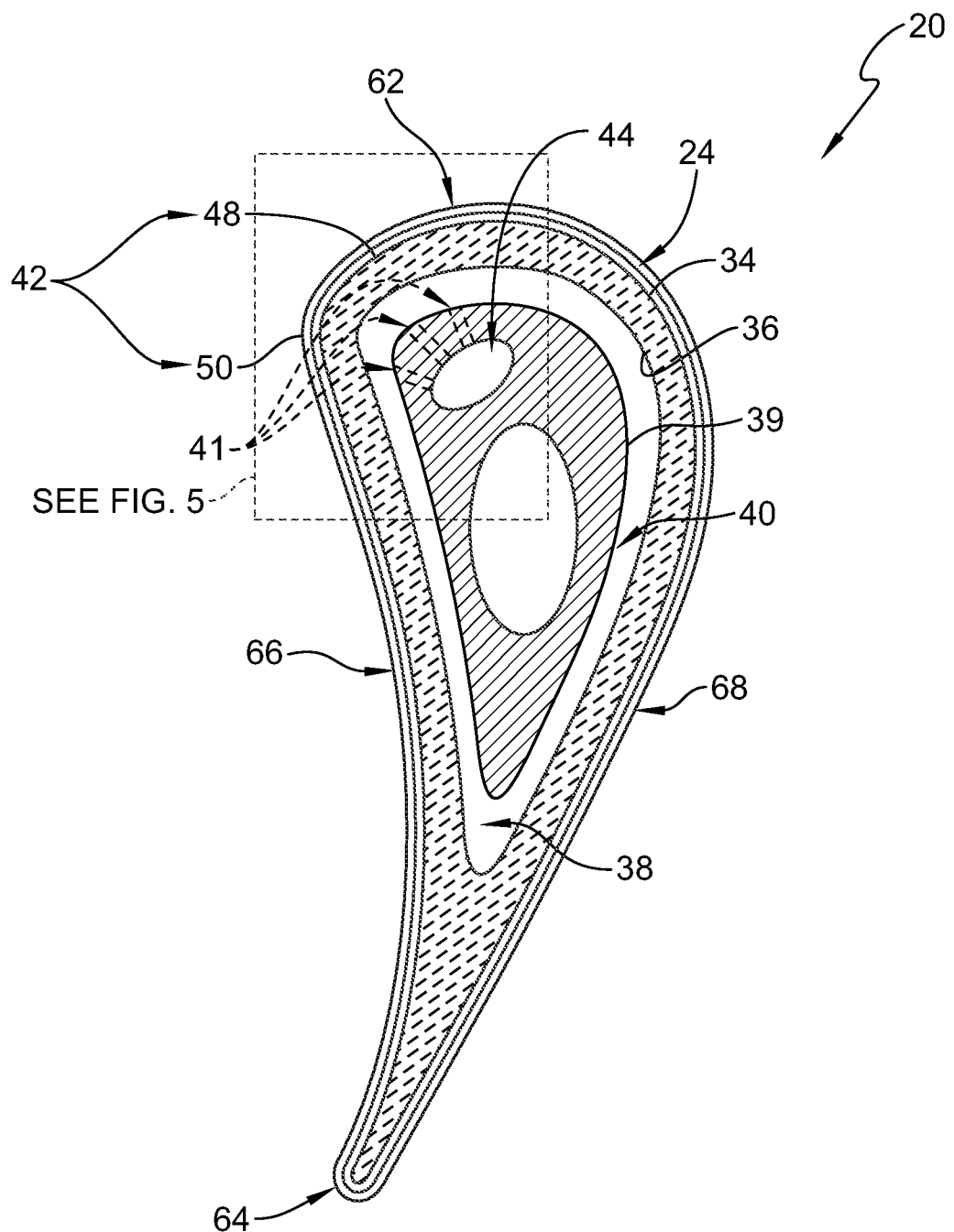
FIG. 4 is a section view of the static turbine vane ring of FIG. 2 taking along line 4-4 showing the ceramic matrix composite vane has a protective coating that surrounds an outer surface of the ceramic matrix composite vane.

In the illustrative embodiment, the ceramic matrix composite component 24, 26, 28 includes a protective coating 42 that surrounds an outer surface 34 of the component 24, 26 as shown in FIG. 4. The protective coating 42 includes a bond layer 48 and an environmental barrier coating layer 50 in the illustrative embodiment. The bond layer 48 contacts the outer surface 34 of the ceramic matrix composite component 24, 26 (outer surface 80 for the seal segment 28). The environmental barrier coating layer 50 is exposed to hot gases flowing through a gas path 17 of the gas turbine engine 10.

In the illustrative embodiment, the environmental barrier coating layer 50 surrounds the bond layer 48. In other embodiments, the protective coating 42 may only include the environmental barrier coating layer 50 such that the environmental barrier coating layer 50 surrounds the outer surface 34, 80 of the ceramic matrix composite component 24, 26, 28.

Impact damage 30 to the protective coating 42 may cause cracks or spalling in the protective coating 42 that leaves the ceramic matrix composite materials of the component 24, 26, 28 exposed to hot gases in the gas path 17. As such, the component 24, 26, 28 may be visually or non-visually inspected to determine the extent of damage 30 to the protective coating 42 and/or the ceramic matrix composite materials of the component 24, 26, 28.

In both visual and non-visual inspections 122, 124, certain areas of the component 24, 26, 28 may be more rigorously inspected than other areas. Each component 24, 26, 28 has a high-risk zone, a medium-risk zone, a low-risk zone, and a no risk zone. The high-risk zone is more likely to endure impact events resulting in damage 30 to the component 24, 26, 28 and therefore is inspected thoroughly. The medium-risk zone is less likely to have damage compared to the high-risk zone, but still could be inspected. The low-risk zone is less likely to have damage compared to the medium-risk zone and may inspected less regularly then the high and medium-risk zones. However, the no risk zone could rarely be inspection as these areas are not in the gas path 17.

For vanes 24 included in the vane assemblies 20, the high-risk zone includes a leading edge 62 and a trailing edge 64 of the vane 24 as shown in FIG. 4. The vane 24 includes an outer platform 52 that defines an outer boundary surface 56 of the gas path 17, an inner platform 54 spaced apart radially from the outer platform 52 to define an inner boundary surface 58 of the gas path 17, and an airfoil 60 that extends radially between the outer and inner platforms 52, 54 as shown in FIG. 2. The airfoil 60 is shaped to form the leading edge 62 and the trailing edge 64 spaced axially aft of the leading edge 62. The leading edge 62 and trailing edge 64 of the airfoil 60 are high at risk for damage.

The medium-risk zone includes a pressure side 66 and a suction side 68 of the airfoil 60 included in the vane 24 as shown in FIG. 4. The pressure and suction sides 66, 68 of the airfoil 60 extend axially between the leading and trailing edges 62, 64.

The low-risk zone includes the outer and inner boundary surfaces 56, 58 of the platforms 52, 54 as shown in FIG. 2. The no risk zone includes all surfaces of the vane 24 outside of the gas path 17. For instance, the outer and inner platforms 52, 54 radially inward and outward of the gas path 17.

Similar to the vane 24, the blades 26 have an airfoil 72 with leading and trailing edges and pressure and suction sides as shown in FIG. 2. The high-risk zone for blades 26 included in the bladed wheel assemblies 22 includes the leading edge and the trailing edge of the airfoil 72 included the blade 26, while the medium-risk zone includes the pressure and suction sides of the airfoil 72 included in the blade 26.

The blade 26 further includes a root 70 that couples the blade 26 to a rotor disk 76 included in the bladed wheel assembly 22 and a platform 74 that extends circumferentially from the airfoil 72 as shown in FIG. 2. The airfoil 72 that extends radially outward from the root 70 into the gas path 17.

The low-risk zone includes a gas path surface 78 of the platform 74 as shown in FIG. 2. The no risk zone includes the surfaces of the blade 26 radially inward and outward of the gas path 17. The root 70 is included in the no risk zone.

For seal segments 28 included in the bladed wheel assemblies 22, the seal segment 28 may have only a low-risk zone, as the seal segment 28 is not directly in the gas path 17. The seal segment 28 forms a radially-inwardly facing surface 80 that is adjacent to the blades 26 to resist gases from passing over the blades 26 without interacting with the blades 26 as shown in FIG. 2. The low-risk zone includes the radially-inwardly facing surface 80 of the seal segment 28.

The visual inspection 122 includes at least one of comparing a shape, a color, and thermography of the ceramic matrix composite component 24, 26, 28 to a datum shape, a datum color, and a datum thermographic image of the ceramic matrix composite component 24, 26, 28. Based on the comparison, the method includes determining if the shape, color, and thermography of the ceramic matrix composite component 24, 26, 28 is indicative of impact damage 30 to the ceramic matrix composite component 24, 26, 28. In the illustrative embodiment, the shape, the color, and the thermography of the component 24, 26, 28 is visually inspected for each of the respective zones.

The visual inspection step 122 may include analyzing the shape of the impact damage 30, i.e. central region of coating loss, potential substrate damage, and/or jagged edges. The shape of the impact damage 30 may be cone shaped if the ceramic matrix composite component 24, 26, 28 was damaged on impact. In other instances, the damage 30 to the ceramic matrix composite component 24, 26, 28 may have progressed after initial impact, and may show in 'blended' edges of the ceramic matrix composite component 24, 26, 28. Other characteristics of the shape of the damage 30 may be the depth and/or the discontinuities of depth in the surface of the component 24, 26, 28.

The visual inspection step 122 may also analyze the color contrast of the component 24, 26, 28. Before damage, the protective coating 42 is initially a white coating on grey substrate. As damage to the protective coating 42 occurs, i.e. the coating 42 becomes contaminated, the color of the coating 42 will darken. If the substrate is visible, the substrate may lighted with oxidation.

The visual inspection 122 of the ceramic matrix composite component 24, 26, 28 may be done using a borerscope or may be automated, such as with nano robots. The extent of damage 30 is detected physically by differences in color, contrast, shadowing, etc. The visual inspection 122 may be automated by use of machine vision techniques such as feature edge detection or model matching.

The visual inspection 122 of the ceramic matrix composite component 24, 26, 28 may also be done dimensionally, using a laser or blue/white light. The changes in shape and surface profile are used for the identification of the extent of damage 30. Dimensional inspection may be performed with conventional charged coupling devices (CCD) or complimentary metal oxide semiconductors (CMOS), i.e. videoscope devices using stereoscopic or 3D phase grating tips.

The visual inspection 122 of the ceramic matrix composite component 24, 26, 28 may be done using passive and active thermographic imagining. Passive thermography inspection may use thermal gradients within the ceramic matrix composite component 24, 26, 28. Active thermography inspection may use a flash or purge fluid through a cooling system of the gas turbine engine 10.

Both passive and active thermography inspections enable the visualization of material discontinuities. The material discontinuities may be indicative of coating or substrate delaminations, oblique cracking, thickness variations, and/or coating densification. This includes all heat activation approaches including flash lights, lasers, ultrasonics, eddy currents etc.

The visual inspection 122 of the ceramic matrix composite component 24, 26, 28 may also be done using fluorescent penetrant inspection. Such an inspection method may be done with the component 24, 26, 28 in place in the engine 10. Fluorescent penetrant inspection may be leveraged to determine if there are any cracks within the protective coating 42 or ceramic matrix composite material of the component 24, 26, 28. During fluorescent penetrant inspection, penetrant is placed on the surface via a borescsope, and allowed to infiltrate the cracks. Then a UV excitation source is used to identify regions of penetration.

The visual inspection 122 of the ceramic matrix composite component 24, 26, 28 may be coating specific e.g. Raman Spectroscopy, UV fluorescence, Terahertz imaging. Using the difference in wave reflection and transmission properties (or vibrational spectra in the case of Raman), the coating composition and density maps may indicate damage, missing layers, phase transformation, etc. In the case of terahertz, this will allow the determination of the material thickness and thus the extent of material recession.

The visual inspection 122 of the ceramic matrix composite component 24, 26, 28 may also be done using hyperspectral imaging. By using varying wavelengths of light for imaging, i.e. outside of the visible spectrum, the visual inspection 122 may elucidate different features than those typically observed with the eye. The hyperspectral imagining may improve the positive identification of surface asperities that may have surface contamination that minimizes contrast.

The visual inspection 122 of the ceramic matrix composite component 24, 26, 28 may also be done using a capsule camera. The capsule camera may be attached to one of the blades 26 included in a bladed wheel assembly 22 of the turbine 18 upstream or downstream of the desired component 24. Rotating bladed wheel assembly 22 enables full uninterrupted annulus inspection and may allow monocular, stereoscopic, or infrared inspection depending upon the sensor type.

The non-visual inspection 124 includes comparing a stress level of the ceramic matrix composite component 24, 26, 28 to a predetermined allowable stress threshold and determining if the stress level is below the predetermined allowable stress threshold for the ceramic matrix composite component 24, 26, 28. If the stress level is below the predetermined allowable stress threshold, the component 24, 26, 28 is safe for use in the engine 10. If the stress level is above the predetermined allowable stress threshold, the component 24, 26, 28 is to be repaired before the component 24, 26, 28 may be used in the engine 10.

In the illustrative embodiment, the predetermined allowable stress threshold may vary around the ceramic matrix composite component 24, 26, 28, i.e. a higher threshold where the component 24, 26, 28 is less stressed in service. In some embodiments, the component 24, 26, 28 may have a risk rating based on the influence of the damage 30 on the air system. For example, there may be a different result if the damage 30 is on the leading edge with a low-pressure differential between coolant and gas path, compared to damage 30 on the suction side 68 where there will be a large pressure difference.

The non-visual inspection 124 of the ceramic matrix composite component 24, 26, 28 may be done using shearography. By inducing small amounts of stress into the component 24, 26, 28 (either through thermal or mechanical means), surface or subsurface discontinuities may be determined. The surface or subsurface discontinuities may include cracks in the protective coating 42 or ceramic matrix composite material of the component 24, 26, 28.

The non-visual inspection 124 of the ceramic matrix composite component 24, 26, 28 may also be done using Ultrasonics or Eddy Current. The ultrasonic waves or electrical eddy currents may be used to identify material damage or defects near the surface.

Automated inspection approaches may be 'trained' on a catalogue of ceramic matrix composite impact test results, in addition to the damage rate expectations based on the high-risk, the medium-risk, and low-risk zones. If the inspection is manual, then the results should inform the inspection guidance.

Once the inspection type 122, 124 is selected, the inspection step 112 continues to determining the extent of damage 30 to the ceramic matrix composite component 24, 26, 28 as indicated by block 126 as shown in FIG. 6. Using the selected inspection type, i.e. visual 122 or non-visual 124, the extent of damage 30 to the ceramic matrix composite component 24, 26, 28 is inspected to determine the extent of damage 30 to the ceramic matrix composite component 24, 26, 28.

Figure 5:
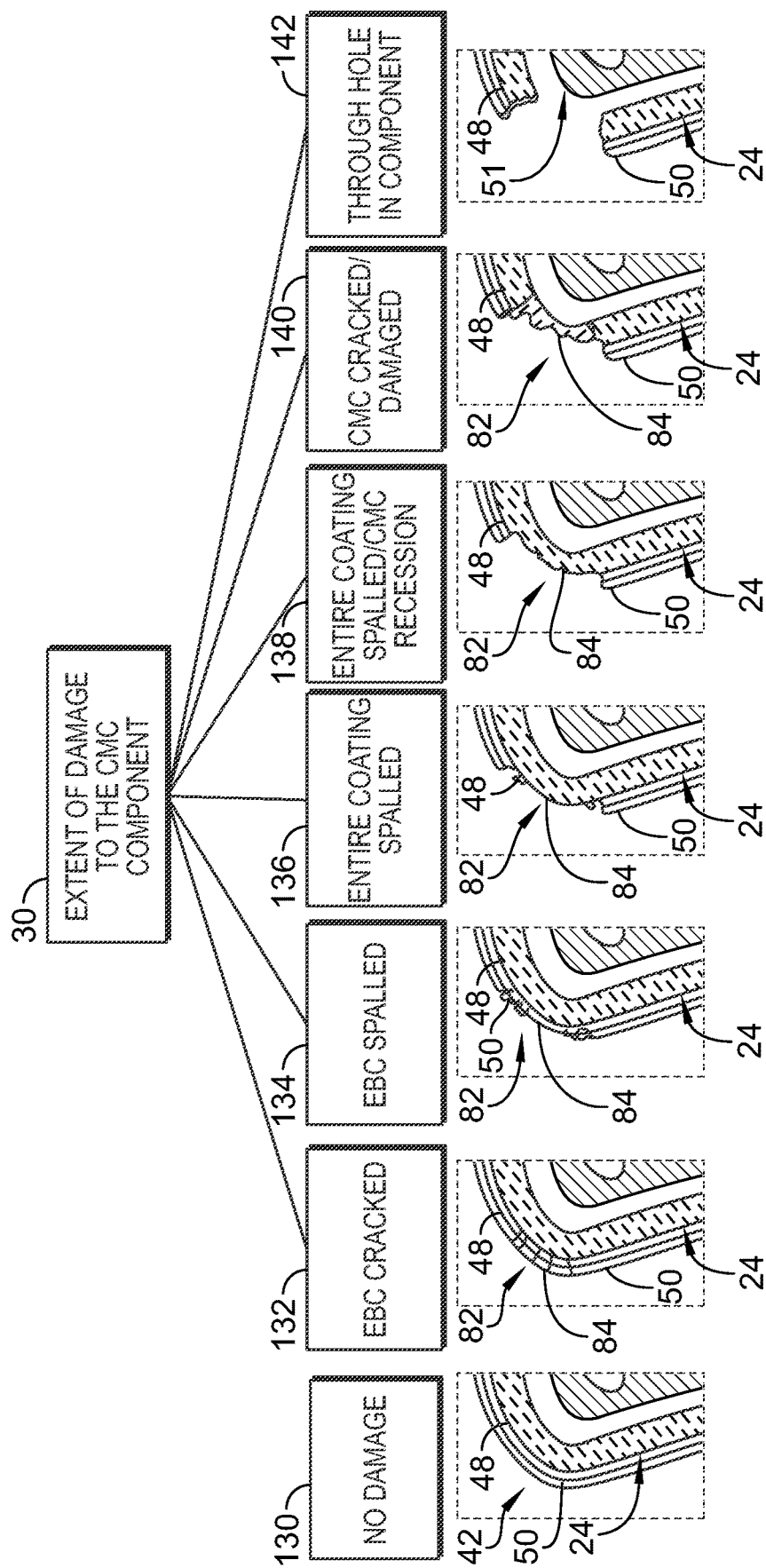
FIG. 5 is a diagrammatic view of different stages of damage to the protective coating and the ceramic matrix composite material of the ceramic matrix composite vane.

Turning again to the vane assembly 20, the vane assembly 20 includes the ceramic matrix composite component 24, or vane 24, and a metallic support structure 32 as shown in FIGS. 2, 4, and 5. The vane 24 forms the outer surface 34 that faces the gas path 17 of the engine 10 and an inner surface 36 that is shaped to form an interior cavity 38. The interior cavity 38 extends radially through the vane 24 and is sized to receive a spar 40 of the support structure 32. The spar 40 extends radially through the interior cavity 38 of the vane 24 to receive force loads applied to the vane 24 by gases flowing through the gas path 17.

The extent of damage 30 is determined based on the damage to the layers 48, 50 of the protective coating 42 and the ceramic matrix composite material of the component 24 as shown in FIG. 5. As the extent of damage 30 progresses, the more adversely affected the vane assembly 20. For example, as opposed to cracking in the environmental barrier coating layer 50, holes 51 through the component 24 may expose the spar 40 of the metallic support structure 32, which may weaken the underlying support structure 32 of the vane assembly 20.

As shown in FIG. 5, the baseline is no damage to the ceramic matrix composite component 24. No damage to the ceramic matrix composite component 24 includes an intact protective coating 42 as indicated by block 130.

Initial signs of impact damage 30 may include cracking in the environmental barrier coating layer 50 of the protective coating 42 of the ceramic matrix composite component 24 as shown in FIG. 5. Cracking in the environmental barrier coating layer 50 without spalling in the environmental barrier coating layer 50 of the protective coating 42 is indicated by block 132.

As the damage progresses, the extent of damage 30 may include spalling in the environmental barrier coating layer 50 of the protective coating 42 as shown in FIG. 5. Spalling in the environmental barrier coating layer 50 without spalling in bond layer 48 of the protective coating 42 is indicated by block 134. In some embodiments, the block 134 may indicate spalling in the environmental barrier coating layer 50 without recession of the ceramic matrix composite material if the protective coating 42 does not include the bond layer 48.

With the bond layer 48 exposed, the damage may progress such the extent of damage 30 includes spalling in both the environmental barrier coating layer 50 and the bond layer 48 of the protective coating 42 as shown in FIG. 5. Spalling in both layers 48, 50 without recession of the ceramic matrix composite material of the ceramic matrix composite component 24 is indicated by block 136.

As the ceramic matrix composite material is exposed to the hot gases in the gas path 17, the extent of damage 30 includes recession of the ceramic matrix composite material of the ceramic matrix composite component 24 as shown in FIG. 5. The extent of damage may also include oxidation of the ceramic matrix composite material in such instances. Recession of the ceramic matrix composite material of the component 24 without spalling in the ceramic matrix composite material of the ceramic matrix composite component 24 is indicated by block 138.

The extent of damage 30 to the component 24 may include spalling in the ceramic matrix composite material of the ceramic matrix composite component 24 as shown in FIG. 5. Spalling in the ceramic matrix composite material of the component 24 without a hole 51 extending through the ceramic matrix composite material into the interior cavity 38 of the ceramic matrix composite component 24 is indicated by block 140.

As the damage progresses, the extent of damage 30 may include the hole 51 that extends through the protective coating 42 and ceramic matrix composite material of the ceramic matrix composite component 24. The hole 51 opens into the interior cavity 38 formed in the ceramic matrix composite component 24, exposing the spar 40 to the hot gases. Such an extent of damage is indicated by block 142.

In some embodiments, once the damage 30 has been inspected, the method 100 may include post-processing of the inspection data. The post-processing may be done externally to the engine 10. The post-processing of the inspection data may be done to derive the predetermined residual severity limit of the component 24, 26, 28 and the associated acceptability of the residual severity of the damage 30.

Once the extent of damage 30 is determined, the damage 30 is then analyzed to determine if the extent of damage 30 is above the predetermined threshold as indicated by block 128. The predetermined threshold is the allowable damage to the ceramic matrix composite component 24, 26, 28 before the damage 30 begins to adversely affect the efficiency of the turbine 18.

In the illustrative embodiment, the predetermined threshold may be discontinuities or unevenness in the outer surface 34 of the vane 24. In other embodiments, the predetermined threshold may be minimal cracking in the environmental barrier coating layer 50 as indicated by block 132.

If the extent of damage 30 is below the predetermined threshold, the component 24, 26, 28 is acceptable for use and the method continues by clearing the engine 10 for re-air as indicated by block 158 in FIG. 6. In some embodiments, once the engine 10 is cleared or permitted for flight, the engine health monitoring system 86 may be reset to detect the signal indicative of impact damage 30 to the ceramic matrix composite component 24, 26, 28 as suggested by block 160.

If the extent of damage 30 is above the predetermined threshold, the method continues to the repair step 114. The repair step 114 begins by determining the repair technique 146, 148, 150, 152, 154, 156 to be used to repair the ceramic matrix composite component 24, 26, 28 based on the extent of damage 30 as indicated by block 144. In the illustrative embodiments, the repair technique 146, 148, 150, 152, 154, 156 may be one of a direct repair 146, 148, 150, 156 of the ceramic matrix composite material of the component 24, 26, 28 and an in-direct repair 152, 154 of the ceramic matrix composite material of the component 24, 26, 28.

Figure 7:
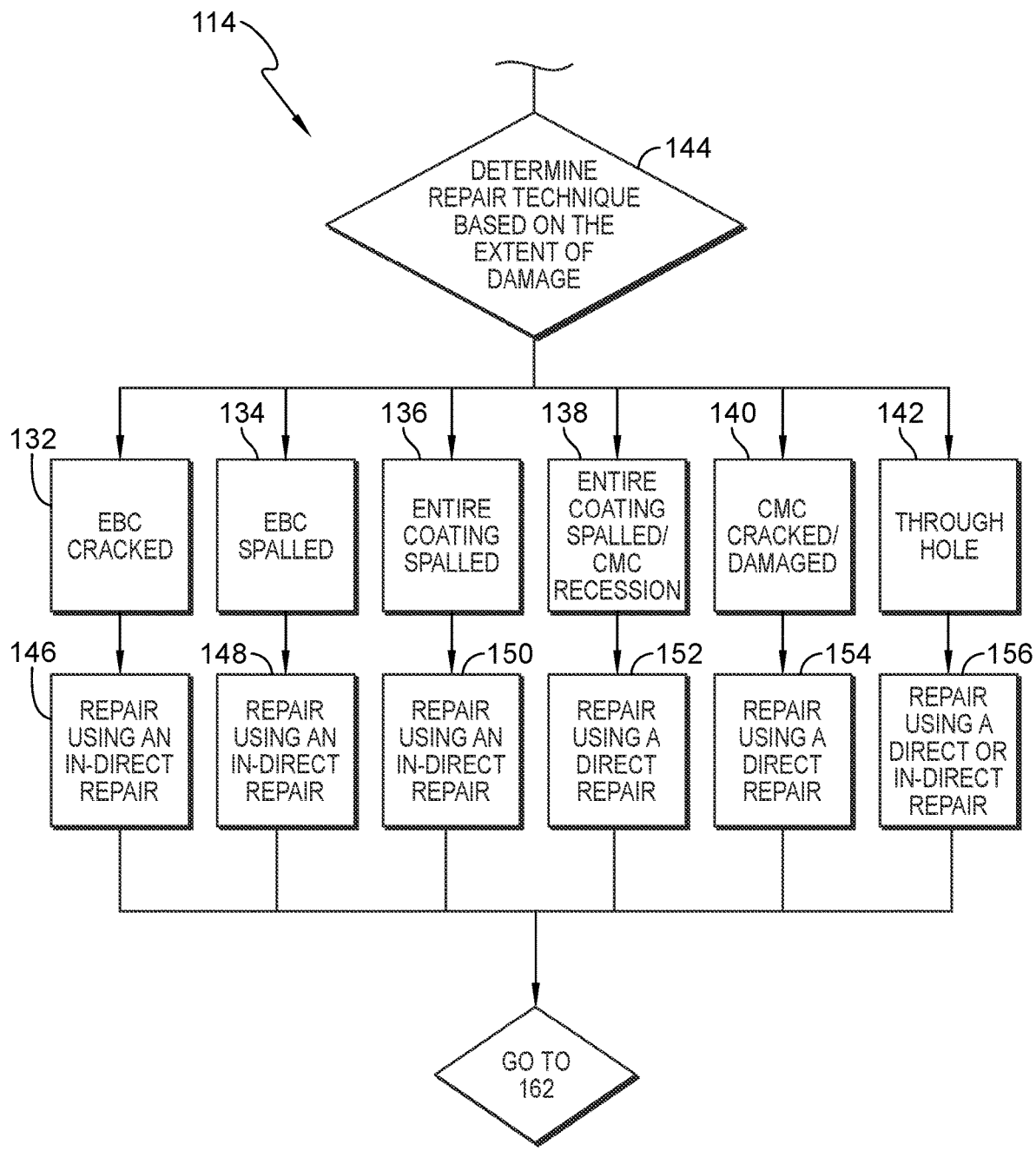
FIG. 7 is a diagrammatic view of the repair step of FIG. 3 showing the repair technique includes one of a direct repair of the ceramic matrix composite material of the ceramic matrix composite component and an in-direct repair of the ceramic matrix composite material of the ceramic matrix composite component based on the extent of damage to the component.

If the extent of damage 30 includes cracking in the environmental barrier coating layer 50 of the protective coating 42 of the component 24 without spalling in the bond layer 48 as indicated by block 132, the method uses an in-direct repair 146 to repair the extent of damage 30 as shown in FIG. 7. Such an in-direct repair 146 may include reapplying a portion of the environmental barrier coating layer 50 to a damaged area 82 of the environmental barrier coating layer 50. The in-direct repair 146 of the cracking in the environmental barrier coating layer 50 may include treating a surface 84 of the damaged area 82 of the environmental barrier coating layer 50 and reapplying a portion of the environmental barrier coating layer 50 that was treated.

If the extent of damage 30 includes spalling in the environmental barrier coating layer 50 of the protective coating 42 without spalling in the bond layer 48 as indicated by block 134, the method uses an in-direct repair 148 to repair the extent of damage 30 as shown in FIG. 7. Such an in-direct repair includes reapplying a portion of the environmental barrier coating layer 50 to the damaged area 82 of the environmental barrier coating layer 50. The in-direct repair of the spalling in the environmental barrier coating layer 50 may include treating the surface 84 of the damaged area 82 of the environmental barrier coating layer 50 and reapplying a portion of the environmental barrier coating layer 50 that was treated.

If the extent of damage 30 to the ceramic matrix composite component 24 includes spalling in both the environmental barrier coating layer 50 and the bond layer 48 of the protective coating 42 without recession in the ceramic matrix composite material as indicated by block 136, the method uses an in-direct repair 150 to repair the extent of damage 30 as shown in FIG. 7. Such an in-direct repair technique 150 may include reapplying a portion of the protective coating 42 to the damaged area 82 of the protective coating 42. In other instances, the in-direct repair 150 may include treating the surface 84 of the damaged area 82 of the protective coating 42 on the ceramic matrix composite component 24 and reapplying a portion of the protective coating 42 on the ceramic matrix composite component 24 that was treated.

In the illustrative embodiments, the in-direct repair 146, 148, 150 of the component 24 may be done using a variety of techniques to repair the extent of damage 30 to the component. For example, the in-direct repair 146, 148, 150 of the different layers 48, 50 of the protective coating 42 may be done using combustion flame spray. The environmental barrier coating layer 50 and the bond layer 48 may be resprayed onto the component 24 using a powder fed Oxy-Acetylene torch.

Additionally, in-direct repair 146, 148, 150 of the protective coating 42 may instead be done using a slurry/sol environmental barrier coating patch repair. Application of ceramic slurries or environmental barrier coating precursor sols coupled with finishing operations in the green state may enable better surface profile control for environmental barrier coating patch repairs In other cases, the in-direct repair 146, 148, 150 of the protective coating 42 may be done using a environmental barrier coating tape cast. Similar to the environmental barrier coating patch repair, a tape cast approach may be easy to adhere with and may potentially be UV or heat cured before firing to ceramacize the patch. Additionally, the in-direct repair of the protective coating 42 may be done using bond coat deposition. The bond coat deposition uses focused energy sources, i.e. electron beam (E-Beam) or tungsten inert gas (TIG), while depositing Silicon through rod/wire feed or blown powder to form a bond coat patch with minimal oxidation.

In other embodiments, the in-direct repair 146, 148, 150 of the protective coating 42 may be done using cold spray of the bond layer 48 or the environmental barrier coating layer 50. Cold spraying the layers 48, 50 is a lower temperature approach, which leverages a highly accelerating gas flow to deposit material on the surface 84. Such a repair technique may be able to reduce levels of oxidation.

In any of the above embodiments, the in-direct repair 146, 148, 150 may include blast cleaning the surface 84 before reapplying the any layers 48, 50 of the protective coating 42. The blast cleaning may be any one of plasma, chemical, laser, or other media to prep the surface 84. Such protective coatings 42 typically use surface preparation for good adherence.

If the extent of damage 30 to the ceramic matrix composite component 24 includes recession of the ceramic matrix composite material of the component 24 without spalling in the ceramic matrix composite material as indicated by block 138, the method uses a direct repair 152 to repair the extent of damage 30 as shown in FIG. 7. Such a direct repair 152 may include applying a ceramic matrix composite material patch to a damaged area 82 in the ceramic matrix composite material of the component 24. In other instances, the direct repair 152 may include machining a surface 84 of the damaged area 82 in the ceramic matrix composite material of the ceramic matrix composite component 24 to smooth the surface of the ceramic matrix composite component 24.

If the extent of damage 30 to the ceramic matrix composite component 24 includes spalling in the ceramic matrix composite material of the ceramic matrix composite component 24 without forming a hole 51 into the cavity 38 as indicated by block 140, the method uses a direct repair 154 to repair the extent of damage 30 as shown in FIG. 7. Such a direct repair 154 may include applying a ceramic matrix composite material patch to a damaged area 82 in the ceramic matrix composite material of the ceramic matrix composite component 24. In other instances, the direct repair 154 may include machining a surface 84 of the damaged area 82 in the ceramic matrix composite material of the ceramic matrix composite component 24 to smooth the surface 84 of the ceramic matrix composite component 24.

In the illustrative embodiments, the direct repair 152, 154 of the component 24 may be done using a variety of techniques to repair the extent of damage 30 to the component 24. For example, the direct repair 152, 154 of the ceramic matrix composite material may be done using a ceramic matrix composite patch repair. Application of surface tapes, slurries, or simply using a focused energy source to remelt the substrate.

In other cases, the direct repair 152, 154 of the ceramic matrix composite material may be done using ceramic matrix composite blending. The blending may be done by machining, either conventional, EDM, laser ablation, or Ultrasonic the surface 84 of the ceramic matrix composite material to remove the damaged area 82. The removal of the damaged area 82 produces a smooth surface profile for subsequent coating 42 application to improve adhesion and aerodynamic performance with minimized downstream turbulence.

Other examples of direct repair techniques 152, 154 for repairing the ceramic matrix composite material may include expanding ceramic foam to fill discontinuities and/or gaps in the ceramic matrix composite material of the component 24. An expanding ceramic foam may be used to minimize the spread of damage 30 in the component 24. The ceramic foam may be subsequently remelted using a laser source to improve the density once the foam is in the correct location.

If the extent of damage 30 to the ceramic matrix composite component 24 includes a hole 51 that extends through the protective coating 42 and ceramic matrix composite material of the component 24 and opens into the interior cavity 38 as indicated by block 146, the method may use one of an direct repair or an in-direct pair 156. Such a repair 156 may include sealing the hole 51 in the ceramic matrix composite material of the component 24 with ceramic foam. Filling the hole 51 may minimize ingress of hot gases into the interior cavity 38, or in the cases of the seal segment 28, the annular cavity 37. The repair 156 may include sealing the hole 51 in the component 24 with other materials to minimize ingress of hot gases into the cavity 38.

In the illustrative embodiments, the direct/in-direct repair 156 of the component 24 may be done using a variety of techniques to repair the extent of damage 30 to the component 24. For example, the repair 156 for repairing the ceramic matrix composite material may include additive layer manufacturing to fill the hole 51 or gaps in the ceramic matrix composite material.

Even if the hole 51 in the ceramic matrix composite material is not directly repairable, the vane assembly 20 may be repaired by sealing the interior cavity 38 of the component 24. As such, combustion gas ingress into the interior cavity 38 may be minimized an enable sufficient flight cycles to the engine 10. The hole 51 may be filled using wire-fed direct laser deposition processes, and includes the use of dissimilar fillings which may be easier to deposit with the component 24 in the engine 10.

Additionally, the in-direct repair 156 may also include applying a thermal barrier coating to the spar 40 before sealing, which may also enable sufficient additional flight cycles to obtain the next shop visit. The thermal barrier coating (TBC) may be applied using combustion flame spray onto the spar 40. In the event a hole 51 forms in the ceramic matrix composite material and the spar 40 is exposed, TBC may be applied through combustion flame spray to prevent additional damage zone growth in the event that the ceramic matrix composite patch or environmental barrier coating patch fails.

In other cases, the repair 156 may be done by removing debris or material from sealing and/or cooling features in the component 24. In some embodiments, trailing edge cooling holes (not shown) in the component 24 may be enlarged. As trailing edge cooling hole(s) increase in size, the leading edge discourager flow may increase to prevent leading edge ingestion. To do so, a potential repair may be to open the discourager holes, either by removing/maching material to enlarge discourager holes, removing/maching material to make new discourager holes, and/or removing a pin to open discourager holes.

Another potential repair may be to design the air system to be able to feed the upper limit of air, but until damage is detected, this air is vented overboard (or somewhere else in the engine with minimal spoiling losses). Then a valve may be opened to redirect the air to the air system.

In other embodiments, another in-direct repair 156 may include increasing the size of impingement holes 41 included in the spar 40. The impingement holes 41 extend through the spar 40 fluidly connecting a cooling channel 44 of the support structure 32 to the interior cavity 38 of the vane 24 as suggested in FIG. 4. The size of the impingement holes 41 may be increased in damaged vanes 24 to increase the flow of air in this area. Another in-direct repair 156 may be to increase leakage (dedicated feed) from upstream seal segment 28 of the bladed wheel assembly 22. Increasing the leakage from the seal segment 28 may be done in a similar manner as removing the material to form the discourage holes.

Similar, if not the same, repair techniques 146, 148, 150, 152, 154, 156 may be used for other components, such as the blades 26 and the seal segments 28 of the bladed wheel assemblies 22. The repair techniques 146, 148, 150, 152, 154, 156 may be adapted for the specific component 26, 28.

Figure 8:
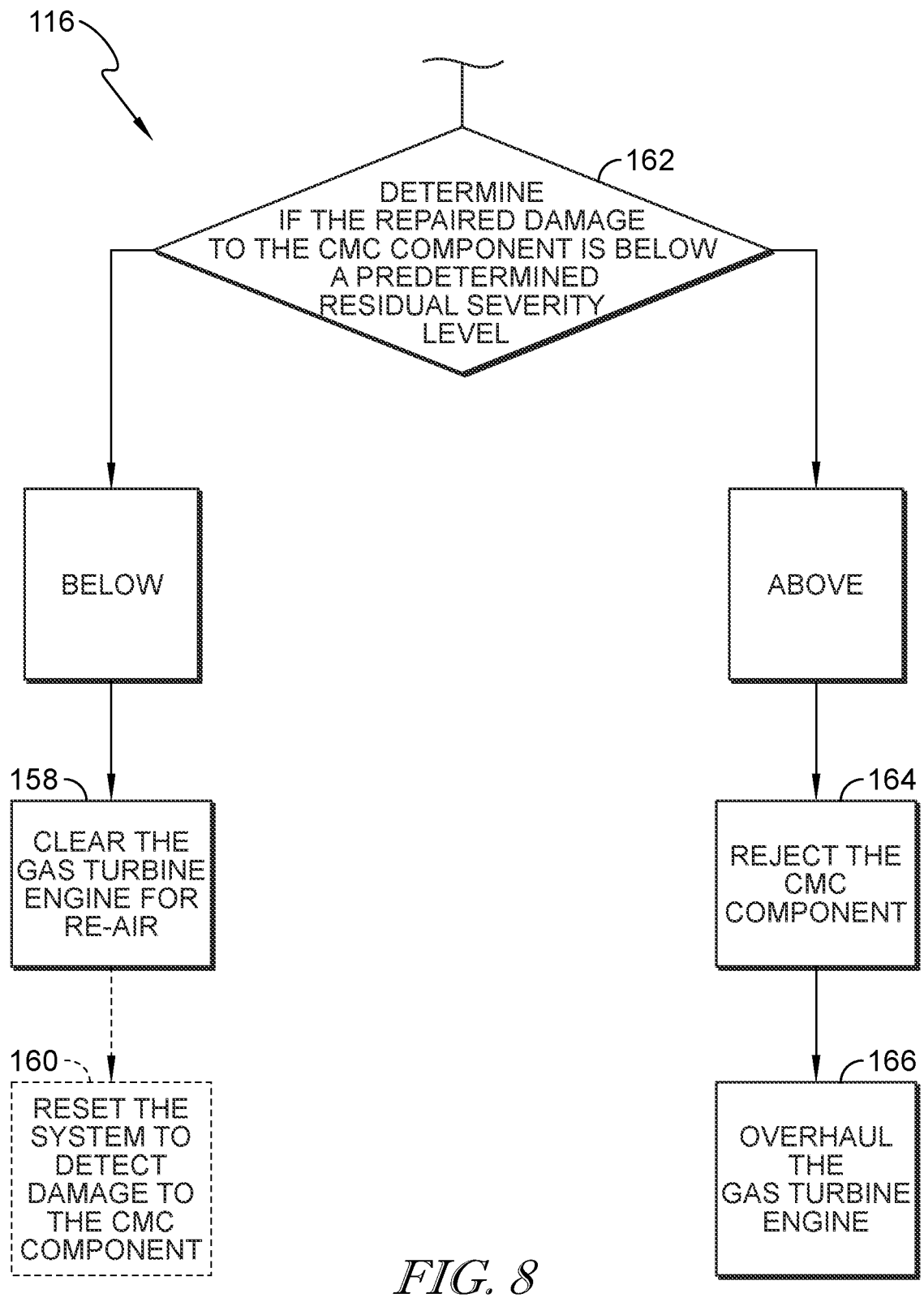
FIG. 8 is a diagrammatic view of the assessment step of FIG. 3 showing the assessment step includes determining if the repaired damaged to the ceramic matrix composite component is below a predetermined residual severity limit.
Figure 9:
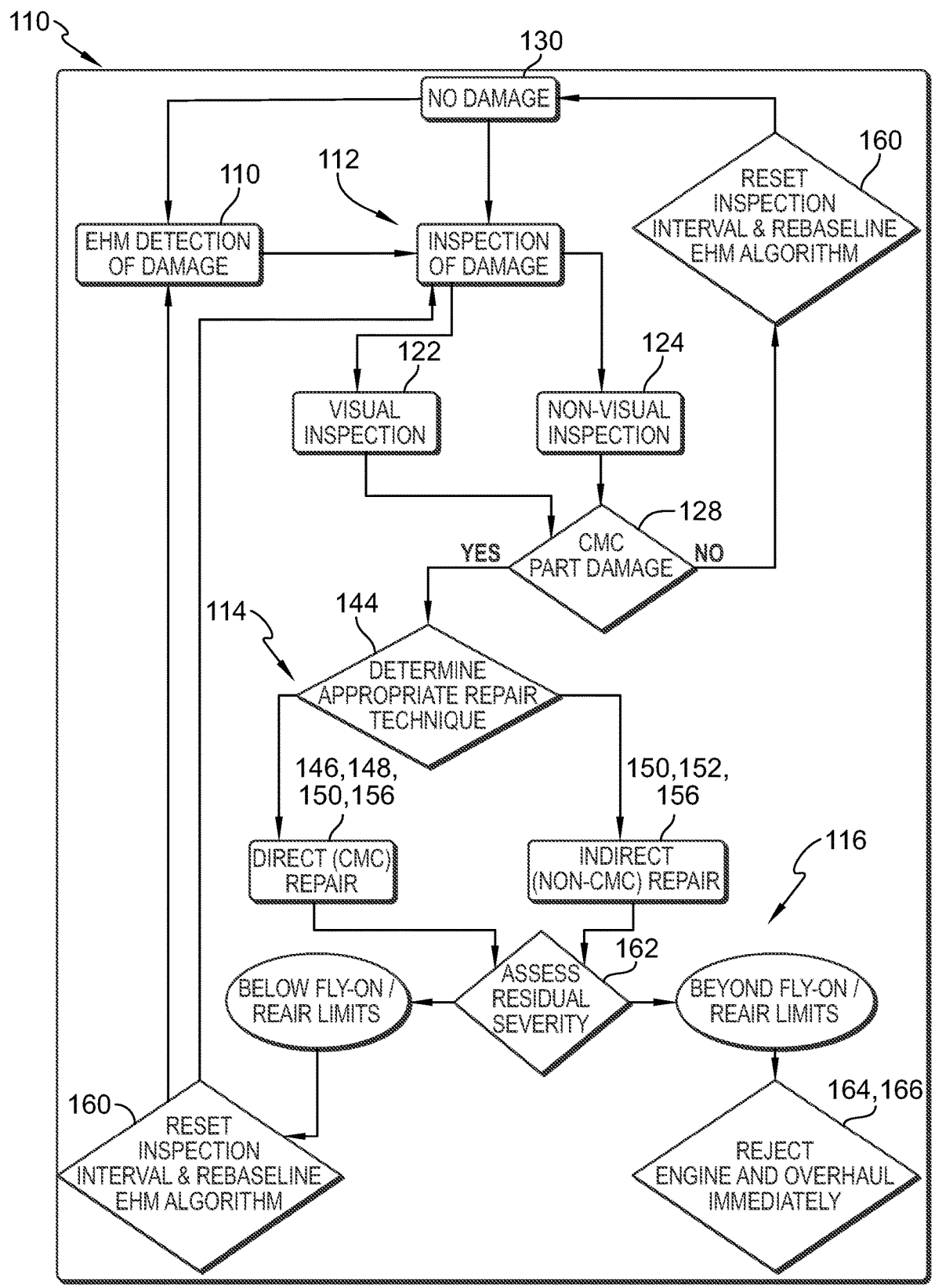
FIG. 9 is a diagrammatic view of the method of FIG. 3 showing the method includes a detection step along with the inspection, repair, and assessment steps.

Once the extent of damage 30 to the ceramic matrix composite component 24, 26, 28 is repaired, the method continues to the assessment step 116 as shown in FIG. 8. The assessment step 116 includes determining if the repaired damage to the ceramic matrix composite component 24, 26, 28 is below a predetermined residual severity limit as indicated by block 162. In the illustrative embodiment, the predetermined residual severity limit is the allowable damage to the component 24, 26, 28 without it adversely affecting the performance of the vane assembly 20 and/or the gas turbine engine 10.

If the repaired damage to the ceramic matrix composite component 24, 26, 28 is below the predetermined residual severity limit, i.e. the damage 30 is not adversely affecting the performance of the component 24, 26, 28; the gas turbine engine 10 is cleared or permitted for flight as indicated by block 158. Once the gas turbine engine 10 is cleared or permitted for flight, the engine health monitoring system 86 may be reset to detect the signal indicative of impact damage 30 as indicated by block 160.

The engine health monitoring system 86 may be reset based on the residual severity limit of the repaired damage. In this way, the engine health monitoring system 86 may detect impact damage 30 later as the residual severity of the damage 30 may affect the performance of the component 24, 26, 28.

If the repaired damage to the ceramic matrix composite component 24, 26, 28 is above the predetermined residual severity limit, the ceramic matrix composite component 24, 26, 28 may be rejected as indicated by block 164. The gas turbine engine 10 may then be marked for overhaul to replace the component 24, 26, 28 or make other repairs as indicated by block 166.

In the illustrative embodiments, the ceramic matrix composite component 24, 26, 28 is one of a vane component 24, a blade component 26, a shroud component 28, a seal component, and combustion liner component. The method 100 may be adapted for any type of ceramic matrix composite component 24, 26, 28 in the gas turbine engine 10.

The present disclosure relates to a method of mitigating the relatively low capability of ceramic matrix composite (CMC) components when subjected to impact from domestic or foreign object debris. Impact damage 30 is likely to be a significant life-cycle cost headwind, relative to metallic components. Therefore, suitable inspection and repair strategies and methods may be useful to enable continued operation in case of impact events without adversely affecting operational safety.

Environmental barrier coatings (EBC) may be used to protect the ceramic matrix composite materials of the components. In impact situations, recession mechanism that propagates damage if the coating is removed/spalled Compared to metallic components, CMC components 24, 26, 28 may be less tolerant to impact events. For CMC components 24, 26, 28 used in the turbine 18 of the gas turbine engine 10, the impact will typically be caused by domestic object debris. However, the other failure modes may result in EBC spallation and/or holing in the ceramic matrix composite material.

As a result of damage to CMC parts, potential safety concerns arise, which may include additional dynamic forcing of adjacent blade rows, increased disc temperature, and CMC system debris blocking cooling/sealing features. The dynamics concern for both up and downstream bladed wheel assemblies 22 may be caused by additional one (or number of damaged parts) per revolution excitation. This could be due to a change in the gas path surfaces, i.e. directly changing the local gas path pressure distribution, or an indirect change as a result of the holing, i.e. outflowing of secondary air disrupting the primary gas path flows.

The increased disc temperature may occur because the cooling flows are disrupted and other elements of the structure become hotter. Increased disc temperature may also be caused by hot gases directly contacting the structure where the pressure gradient permits hot gas ingress. This can open seal clearances for example blade rim seals due to axial deflection of the vane assembly 20 such that hot gas ingress into a disk cavity between the blade stages cannot be prevented This submission relates to a series of mitigations, to initially determine that the CMC components 24, 26, 28 have been damaged and then if appropriate, to repair them. The steps of the mitigation method are shown in FIGS. 3 and 6-9.

The susceptible areas of the CMC component 24, 26, 28 change depending on the local boundary conditions, i.e. temperature, pressure, velocity, stress state. The susceptible areas may also change according to the potential orientation of impact debris travelling in the gas path 17. Inspection and repair capabilities may be tailored to maximise capability.

The specifics captured here mainly relate to a vane assembly 20 in the turbine 18 of the gas turbine engine 10, but the method 100 may be applied to any ceramic matrix composite component, like the blade 26 and/or the seal segment 28.

Inspection and detection may not be undertaken immediately after an impact event, therefore, the damage assessed will be on the spectrum shown in FIG. 5. The inspection, detection, and repair requirements will change across the damage spectrum.

In some embodiments, the engine health monitoring system 86 may be configured to direct the inspection of the ceramic matrix composite component 24, 26, 28 assembled in a gas turbine engine 10 to determine the extent of damage to the ceramic matrix composite component 24, 26, 28. The engine health monitoring 86 system may inspect the ceramic matrix composite component 24, 26, 28 assembled in a gas turbine engine using the sensors 86, 88 to determine the extent of damage 30 to the ceramic matrix composite component 24, 26, 28. The engine health monitoring system 86 may determine if the extent of damage 30 to the ceramic matrix composite component 24, 26, 28 is above a predetermined threshold.

In some embodiments, the engine health monitoring system 86 may be configured to determine the repair technique to repair the damage 30 to the ceramic matrix composite component 24, 26, 28 based on the extent of damage 30 to the component 24, 26, 28. The ceramic matrix composite component 24, 26, 28 may be repaired using the repair technique determined by the engine health monitoring system 86.

In some embodiments, after the ceramic matrix composite material is repaired, the engine health monitoring system 86 may be configured to determine if the repaired damage to the ceramic matrix composite component 24, 26, 28 is below a predetermined residual severity limit. If the repaired damage to the ceramic matrix composite component 24, 26, 28 is below the predetermined residual severity limit, the engine health monitoring system 86 may clear the gas turbine engine 10 for flight.

In some embodiments, the engine health monitoring system 86 is configured to receive the signal indicative of a detection of impact damage 30 to the ceramic matrix composite component 24, 26, 28 in the gas turbine engine 10. If the extent of damage is below the predetermined threshold, the engine health monitoring system 86 may reset to detect the signal indicative of impact damage 30 to the ceramic matrix composite component 24, 26, 28.

In some embodiments, the signal may be one of a temperature measurement and a pressure measurement within the gas turbine engine 10. The signal may be measured by sensors 88, 90 included in the engine health monitoring system 86. In some embodiments, the ceramic matrix composite component 24, 26, 28 is one of a vane component, a blade component, a shroud component, a seal component, and combustion liner component.

The engine health monitoring algorithm should assess the step change relative to modelled baseline, i.e. same number for every engine, the step change relative to engine specific measured baseline, i.e. different number for every engine, and the trending change with rate of change beyond given limits to determine if an impact event has occurred. The baseline may be reset after a thorough inspection.

Along with a reactive inspection carried out once the detection system has triggered, it may also be important to also carry out proactive inspections. This may allow damage to be captured earlier and inform damage progression rates.

The 'proactive' inspection interval may vary depending on several factors. For example, impact events are stochastic and therefore inspections may be repeated on a periodic basis, related to the time taken to generate a safety concern. Additionally, recession is driven by temperature, pressure, water vapour content, and velocity, so the inspection procedure/timing may be different for each ceramic matrix composite component 24, 26, 28 in the engine 10.

Debris may come from the combustion module or other high pressure turbine components, so further downstream parts may have more impact events. Sensitivity to repair, i.e. if the component 24, 26, 28 may be easier and/or more likely succeed, the less the damage has propagated and thus it may be advantageous to inspect the component 24, 26, 28 more frequently.

The damage rate on the component 24, 26, 28 may vary. Post-repair on the component 24, 26, 28, repeat inspections may be completed more frequently.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method for monitoring components in gas turbine engines, the method comprising: inspecting a ceramic matrix composite component assembled in a gas turbine engine to determine an extent of damage to the ceramic matrix composite component, the ceramic matrix composite component including a protective coating that surrounds an outer surface of the ceramic matrix composite component, the protective coating having a bond layer that contacts the outer surface of the ceramic matrix composite component and an environmental barrier coating layer that surrounds the bond layer and is exposed to hot gases flowing through a primary flow path of the gas turbine engine, and wherein the inspection step includes one of a visual inspection and a non-visual inspection of the extent of damage to the ceramic matrix composite component,
  determining if the extent of damage to the ceramic matrix composite component is above or below a predetermined threshold,
  clearing the gas turbine engine for flight if the extent of damage is below the predetermined threshold, wherein the predetermined threshold is minimal cracking in the environmental barrier coating layer,
  determining a repair technique to repair the damage to the ceramic matrix composite component based on the extent of damage to the ceramic matrix composite component if the extent of damage is above the predetermined threshold,
  repairing the ceramic matrix composite component using the repair technique,
  determining if the repaired damage to the ceramic matrix composite component is below a predetermined residual severity limit and clearing the gas turbine engine for flight if the repaired damage to the ceramic matrix composite component is below the predetermined residual severity limit, and
  resetting an engine health monitoring system included in the gas turbine engine to detect a signal indicative of a detection of impact damage to the ceramic matrix composite component based on the residual severity of either the damage below the predetermined threshold or the repaired damage to the ceramic matrix composite component so that the engine health monitoring system detects impact damage later as the residual severity may affect the performance of the component,
  wherein the ceramic matrix composite component has a high-risk zone that is more likely to endure impact events resulting in impact damage, a medium-risk zone that is less likely to have impact damage than the high-risk zone and inspected less frequently than the high-risk zone, and a low-risk zone that is less likely to have impact damage than the medium-risk zone and inspected less frequently than the medium-risk zone.

2. The method of claim 1, further comprising receiving a signal to the engine health monitoring system included in the gas turbine engine indicative of a detection of impact damage to the ceramic matrix composite component in the gas turbine engine.

3. The method of claim 2, further comprising resetting the engine health monitoring system to detect the signal indicative of impact damage to the ceramic matrix composite component if the extent of damage is below the predetermined threshold.

4. The method of claim 3, wherein the repair technique includes one of a direct repair of the ceramic matrix composite material of the ceramic matrix composite component and an in-direct repair of the ceramic matrix composite material of the ceramic matrix composite component.

5. The method of claim 4, wherein the inspection step includes one of a visual inspection and a non-visual inspection of the extent of damage to the ceramic matrix composite component.

6. The method of claim 5, wherein the visual inspection includes at least one of comparing a shape of the ceramic matrix composite component to a datum shape, comparing a color of the ceramic matrix composite component to a datum color, and comparing a thermographic image of the ceramic matrix composite component to a datum thermographic image, and determining if the shape, color, and thermography of the ceramic matrix composite component is indicative of impact damage to the ceramic matrix composite component.

7. The method of claim 5, wherein the non-visual inspection includes comparing a stress level of the ceramic matrix composite component to a predetermined allowable stress threshold and determining if the stress level is below the predetermined allowable stress threshold for the ceramic matrix composite component.

8. The method of claim 1, wherein the repair technique includes an in-direct repair of the ceramic matrix composite material of the ceramic matrix composite component if the extent of damage to the ceramic matrix composite component includes one of (i) cracking in the environmental barrier coating layer of the protective coating of the ceramic matrix composite component without spalling in the environmental barrier coating layer of the protective coating and (ii) spalling in the environmental barrier coating layer of the protective coating without spalling in the bond layer of the protective coating.

9. The method of claim 8, wherein the in-direct repair includes one of (i) reapplying a portion of the environmental barrier coating layer to a damaged area of the environmental barrier coating layer of the protective coating on the ceramic matrix composite component and (ii) treating a surface of the damaged area of the environmental barrier coating layer and reapplying a portion of the environmental barrier coating layer of the protective coating on the ceramic matrix composite component that was treated.

10. The method of claim 1, wherein the repair technique includes an in-direct repair of the ceramic matrix composite material of the ceramic matrix composite component if the extent of damage to the ceramic matrix composite component includes spalling in both the environmental barrier coating layer and the bond layer of the protective coating without recession of the ceramic matrix composite material of the ceramic matrix composite component.

11. The method of claim 10, wherein the in-direct repair includes one of (i) reapplying a portion of the protective coating to a damaged area of the protective coating, and (iii) treating a surface of the damaged area of the protective coating on the ceramic matrix composite component and reapplying a portion of the protective coating on the ceramic matrix composite component that was treated.

12. The method of claim 1, wherein the repair technique includes a direct repair of the ceramic matrix composite material of the ceramic matrix composite component if the extent of damage to the ceramic matrix composite component includes one of (i) recession of the ceramic matrix composite material of the ceramic matrix composite component without spalling in the ceramic matrix composite material of the ceramic matrix composite component and (ii) spalling in the ceramic matrix composite material of the ceramic matrix composite component without a hole extending through the ceramic matrix composite material into an interior cavity of the ceramic matrix composite component.

13. The method of claim 12, wherein the direct repair includes one of (i) applying a ceramic matrix composite material patch to a damaged area in the ceramic matrix composite material of the ceramic matrix composite component and (ii) machining a surface of the damaged area in the ceramic matrix composite material of the ceramic matrix composite component to smooth the surface of the ceramic matrix composite component.

14. The method of claim 1, wherein the repair technique includes one of a direct repair of the ceramic matrix composite material of the ceramic matrix composite component and an in-direct repair of the ceramic matrix composite material of the ceramic matrix composite component if the extent of damage to the ceramic matrix composite component includes a hole that extends through the protective coating and ceramic matrix composite material of the ceramic matrix composite component and opens into an interior cavity formed in the ceramic matrix composite component.

15. The method of claim 14, wherein the indirect repair includes one of (i) sealing the hole in the ceramic matrix composite material of the ceramic matrix composite component to minimize ingress of hot gases into the interior cavity and (ii) applying the protective coating to a surface of a metallic component located in the interior cavity of the ceramic matrix composite component.

16. The method of claim 1, wherein the signal is one of a temperature measurement and a pressure measurement within the gas turbine engine that is measured by a sensor included in the engine health monitoring system and wherein the ceramic matrix composite component is one of a vane component, a blade component, a shroud component, a seal component, and combustion liner component.

* * * * *